United States Patent Office 3,848,051
Patented Nov. 12, 1974

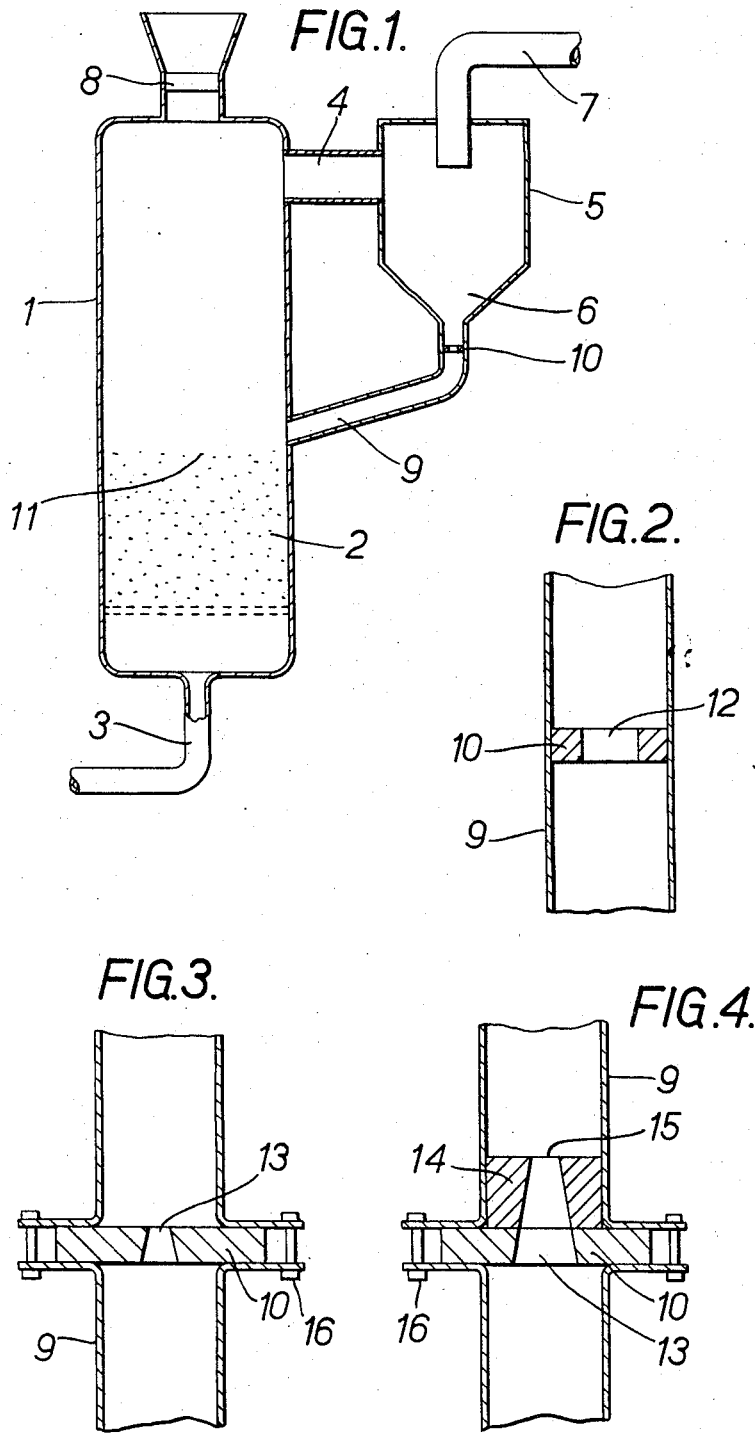

3,848,051
PROCESS FOR THE PRODUCTION OF
TITANIUM TETRACHLORIDE
Robert J. Mas, Thann, and Andre Louis Michaud, Vieux
Thann, France, assignors to Fabriques de Produits
Chimiques de Thann et de Mulhouse, Thann, France
Continuation of application Ser. No. 664,665, Aug. 31,
1967. This application June 4, 1970, Ser. No. 43,598
Claims priority, application France, Sept. 6, 1966,
75,419
Int. Cl. C01g 23/04
U.S. Cl. 423—79                                   4 Claims

ABSTRACT OF THE DISCLOSURE

The chlorination of titanium minerals and coke to give titanium tetrachloride using a fluidised bed is carried out in apparatus comprising a cyclone or other separator in the outlet line, a conduit leading from the separator back to the reactor for recycling fines separated in the cyclone, and a diaphragm in the conduit of open cross-sectional are at most ¼, preferably ¼ to ⅟₅₀, that of the outlet line from the reactor to the cyclone.

---

This application is a continuation of application Ser. No. 664,665, filed Aug. 31, 1967 and now abandoned.

This invention relates to apparatus suitable for carrying out gas-solid reactions in which the solid reactant or reactants are in the form of a fluidised bed, in particular the production of titanium tetrachloride by the reaction of chlorine with a titanium mineral, e.g. rutile or ilmenite or a concentrate of some form of titanium dioxide, and coke or other carbonaceous material.

In such processes the titanium dioxide material usually has a particle size of 0.25–0.05 mm., and the coke a particle size of 3.15–0.10 mm. However, as a result of the reactions occurring and of abrasion there is formed a certain amount of finely divided material or "fines," which is entrained with the gases leaving the reactor. This can represent a substantial loss of valuable material, as well as giving rise to difficulties and abrasion in subsequent operations, and various proposals have been put forward for reducing or mitigating the effects of such entrainment.

One such proposal has been to limit the amount of the solid particles entrained by increasing the height of the reactor, but this increases the capital cost without completely solving the problem.

Attempts have been made to remove the entrained particles from the gases issuing from the reactor and to recycle them. Thus it has been proposed to introduce into the circuit for the removal of the gases devices for separating solid constituents such as filters, cyclones, electrostatic precipitators, etc. If the solids are effectively recovered in large measure they still have to be recycled, and this requires periodical emptying of the recovery apparatus, and sometimes treatments such as washing or grading before the recovered product or products can be recycled with fresh material.

All these periodical operations, which require additional capital investment and manual labour, present even greater difficulties when the reaction takes place at a high temperature as does the production of titanium tetrachloride, and necessitates the handling of hot products and often loss of their useful heat if the fresh products are introduced into the reactor at ordinary temperature.

It is an object of the invention to provide an improved apparatus in which these various disadvantages are mitigated or avoided, and which can be operated on a continuous basis without external intervention, and is compact and relatively low in cost.

In one aspect the invention consists in apparatus suitable for use in the production of titanium tetrachloride by the reaction of chlorine with a fluidised bed of a titanium mineral and coke, which comprises a reactor provided with a gas inlet and means for forming a fluidised bed of solid particles by the action of incoming gas, an outlet for gases from the reactor, means communicating with said outlet for separating solid particles from a gas in which they are entrained, a conduit adapted to feed separated solid particles from the said separating means back to the reactor, and in said conduit a diaphragm having an opening of cross-sectional area less than ¼ of that of the said gas outlet from the reactor.

The invention consists also in the production of titanium tetrachloride using such apparatus.

The invention is illustrated in, and will be described in more detail by reference to, the accompanying drawings, in which:

FIG. 1 is a schematic elevation view of a reactor, including a solids (fines) recovery section, of known type;

FIG. 2 is a large scale view in section of a detailed modification of the reactor of FIG. 1, in accordance with the invention;

FIG. 3 is a similar view of another such modification; and

FIG. 4 is a similar view of yet another such modification.

Referring now to the drawings, the apparatus of FIG. 1 comprises a fluidised bed reactor 1, shown as containing solid particles 2, generally of small or very small particle size, for example from 50 to 6000 microns. Gases are introduced into the reactor 1 through the pipeline 3 at a sufficient rate to allow the solid particles 2 to be fluidised, that is to say to maintain them in turbulent agitation over a well defined and practically constant depth. The gaseous products of the reaction, and solids entrained therein, leave through an outlet line 4 and pass to a cyclone (or other type of separator) 5, in which the entrained solids are separated from the gases. These solids collect at the bottom 6 of the cyclone, whence they are returned to the reactor through a conduit 9. The gases freed from the solid particles are then passed to subsequent treatments through a pipeline 7. The heat losses in cyclone 5 are normally sufficiently low to prevent changes in temperature bringing about changes in the composition of the gases, for example by partial or total condensation of one or more components thereof. Thus the solids separated by the cyclone 5 can be continuously reintroduced into the reactor 1 without any risk of condensation such as could cause obstruction.

A diaphragm 10 is inserted in the conduit 9. Its role is to restrict the passage of gases from the reactor 1 through the conduit 9 instead of through the pipeline 4. A major outflow of gas through pipeline 9 would seriously interfere with the functioning of the cyclone, and prevent efficient separation of the solids.

Since the amounts of gas passing through pipelines 4 and 9 respectively, are substantially proportional to the cross-sectional area of pipeline 4 and to the open area of diaphragm 10, provided the open area of the diaphragm 10 is small, the functioning of the cyclone is no longer disturbed even though the flow of fines through the recovery section is continuous.

The conduit 9 may open into the body of the reactor below the upper surface 11 of the fluidised bed, and this has the advantage that the fine recycled particles cannot be immediately re-entrained by the stream of gas leaving the reactor. Preferably, however, the said opening is slightly above the surface 11 (as shown in FIG. 1) so that gases escaping from the reactor through the conduit 9 will not contain chlorine to be used in the reaction, which would thus be lost to the reaction and would interfere with subsequent operations.

The gases leaving the reactor 1 through the outlet line 4 are a mixture of permanent gases, carbon monoxide and carbon dioxide (no chlorine remains above the surface 11), heavy vapours which are easily condensable, mainly of manganese, zirconium, ferrous and ferric chlorides, and vapours which are more difficult to condense, namely titanium and silicon tetrachlorides (about 45% of the total).

The operating temperature in the reactor 1 is about 1000° C. and is maintained without supplying external heat because the chlorination is exothermic. At this temperature the vapour pressure of the heavy chlorides is sufficiently high for them to be vaporised. A substantial reduction is temperature would produce a reduction in vapour pressure and hence a partial condensation of the heavy chlorides, which could produce seizing-up of the cyclone or blockages of the lines.

Experiments have shown that the use of a cyclone and of tubes of a refractory material of as low an external surface area as possible, so that heat losses can be kept sufficiently low to maintain the temperature of the recycled particles above 800° C., makes it possible to avoid any condensation of ferrous or other heavy metal chloride, and to recover the entrained fines of coke and of rutile in the form of a free-flowing powder without the formation of agglomerates.

The powder run out from the cyclone in this way is immediately recycled to the reactor 1 without interrupting the operation of the cyclone and practically without heat losses, in contrast to the standard processes used before the invention.

Furthermore, depending on the diameter of the diaphragm 10, a small fluidised bed can form at the diaphragm, which further tends to reduce the escape of gases from the reactor 1 through the conduit 9.

The diaphragm 10 may be situated anywhere between the base 6 of the cyclone 5 and the opening of conduit 9 into the reactor 1; it is advantageously placed in a vertical part of the conduit 9, for example close to the cyclone.

The form of the diaphragm 10 may be very simple, and some possible forms are shown in FIGS. 2 to 4, purely by way of example. FIG. 2 shows a diaphragm with a cylindrical orifice 12, while the diaphragm shown in FIG. 3 has a tapered orifice 13. The diaphragm of FIG. 4 resembles that of FIG. 3, but is surmounted by a sleeve 14 with a tapered orifice 15 extending the orifice 13. These various forms are particularly designed to avoid any possibility of blockage of the diaphragm 10. However other forms are generally equally suitable, since the risk of blockage is very slight because of the stream of gas which passes upwards through the diaphragm and may, as already described, form a fluidised mass of the fines above it. Preferable forms of the diaphragm are a truncated cone and a double truncated cone.

The diaphragm 10 may conveniently be positioned between two flanges 16 of the conduit 9 (FIGS. 3 and 4).

The area of the opening of the diaphragm depends on the cross-sectional area of the main outlet pipeline 4, and will generally be between one-fiftieth and one-tenth thereof. Experiments carried out have shown that if this ratio is greater than 1:4 the operation of the cyclone is for practical purposes no longer satisfactory, and if it is less than 1:200 the flow of the fines down the conduit may be seriously obstructed.

The material of the diaphragm 10 must resist corrosion and the high temperature prevailing in the cyclone. It may be a metal or a mixture of metals, refractory brick, concrete, etc. The diaphragm 10 may be integral or consist of several assembled parts.

To show the advantages of a reactor according to the invention there will now be described, in a first Example, a standard industrial process for the preparation of titanium tetrachloride by chlorination, and in a second Example, the same process carried out in a reactor according to the invention.

EXAMPLE 1

A mixture of 30% of coke (particle size 0.3–0.1 mm.) and 70% of rutile (particle size 0.1–0.05 mm.) is introduced into a standard chlorinator of internal diameter 140 cm. and height 460 cm., having a chlorine-resistant refractory lining.

The fluidisation bed is 150 cm. deep. 980 kg./hr. of titanium tetrachloride are produced, and its vapours mixed with coke and rutile fines pass into a cyclone which is periodically discharged manually, the fines being recycled with the fresh material fed to the chlorinator after being washed with water, graded and dried.

After one week's running the yield from the rutile establishes itself at an average of 88%, being generally between 83 and 92% depending on the running conditions, so that the average loss of rutile is 12%.

EXAMPLE 2

The same manufacture as in Example 1 is carried out in a reactor similar to that of FIG. 1, with the diaphragm of FIG. 3. While the dimensions of this chlorinattor reactor are the same as in Example 1, the output is higher at 1470 kg./hr. of titanium tetrachloride. The diameter of the outlet line 4 is 300 mm., and that of the opening of the diaphragm 10 is 80 mm.

During 12 days running neither the cyclone 5 nor the diaphragm 10 nor the conduit 9 were blocked at any time.

Despite the increase in output the yield from the rutile establishes itself at an average of 98%, with maximum variations between 96 and 99%. Thus the average loss has been reduced to 2%, which is due to exceedingly fine particles which cannot be stopped by the cyclone. The average gain over the known method is thus 10%, and also external operations are eliminated. With the conduit 9 opening out above the bed, the yield based on the chlorine charged is unchanged and remains at 100%, as in Example 1.

The recycling of the fines at a high temperature eliminates heat losses, and does not interfere with the operation of the fluidiser.

The entire apparatus can be run independently and continuously without external manual intervention.

Although in Example 2 the dimensions of the chlorinator 1 are the same as in Example 1, the height above the fluidisation bed can very well be reduced, since entrainment of solid particles need no longer be kept down. Such a reduction in the height of the reactor naturally permits a consequent reduction in capital and maintenance costs.

The almost complete elimination of solid dusts which are generally abrasive considerably reduces wear from abrasion of equipment located beyond the cyclone.

We claim:

1. In a process for the continuous production of titanium tetrachloride, wherein a finely divided bed of a titanium mineral and coke is maintained in a reactor, chlorine containing gas is introduced continuously into the lower portion of said bed so as to maintain the solids in said bed in a fluidized state and continuously to react with them, thus producing gaseous reaction products including titanium tetrachloride vapor, and a continuous stream of such gaseous reaction products with solid fines entrained therein is conducted from an upper region of the reactor into a separator in which solid fines are continuously separated and collected from said stream, the improvement which comprises continuously passing the fines collected by said separator directly back into the reactor by gravity flow thereof through a downwardly extending conduit that opens into said reactor at a level therein where the gases therein consist substantially entirely of said gaseous reaction products, while passing continuously from the reactor through said conduit, countercurrent to the returning fines, a limited flow of said gases sufficient to prevent clogging of said conduit by said fines.

2. In a process according to claim 1, restricting said countercurrent flow of said gases through said conduit to a substantially constant amount thereof that is between $\frac{1}{200}$ and $\frac{1}{4}$ of the amount of said gaseous reaction products being conducted into said separator in said stream.

3. A process for the continuous production of titanium tetrachloride by the reaction of chlorine with a titanium mineral in the presence of coke in a fluidized bed with continuous recycle to the fluidized bed of fines separated from the gaseous reaction products wherein the titanium mineral and coke are introduced into a fluidized bed reactor, a fluidized bed of the titanium mineral and coke established, molecular chlorine introduced into the fluidized bed, the titanium mineral chlorinated in the fluidized bed with the molecular chlorine to produce titanium tetrachloride as a gaseous reaction product, the gaseous reaction product including titanium tetrachloride and solid fines entrained therewith removed from the reactor via an exit conduit, the gaseous reaction products separated from the solid fines in a separator, the gaseous reaction products recovered to continuously provide titanium tetrachloride, the separated solid fines continuously recycled to the reactor via a recycle conduit leading from the separator and opening into the reactor at a level above the operating level of the upper surface the fluidized bed and having located in it a non-adjustable fluid flow restriction device, allowing gaseous reaction products from the fluidized bed to pass through the recycle conduit from the reactor to the separator in a direction of flow opposite to that of the recycling fines and establishing in the recycling fines a fluidized bed in the region immediately upstream (from the gas flow view point) of the fluid flow restriction device.

4. A process according to claim 3 in which the fluid flow restriction device is a diaphragm having an aperture of cross-sectional area between $\frac{1}{4}$ and $\frac{1}{200}$ of the cross-sectional area of the exit conduit from the reactor.

References Cited
UNITED STATES PATENTS

| | | | |
|---|---|---|---|
| 2,701,179 | 2/1955 | McKinney | 23—87 |
| 2,745,725 | 5/1956 | Ward et al. | 23—288 |
| 2,799,558 | 7/1957 | Smith et al. | 23—284 |

GEORGE O. PETERS, Primary Examiner

U.S. Cl. X.R.

423—492